(12) United States Patent
Shojayi et al.

(10) Patent No.: US 8,780,748 B1
(45) Date of Patent: Jul. 15, 2014

(54) IPV4 AND IPV6 SINGLE SESSION ON A HOME AGENT

(75) Inventors: Joseph Christopher Shojayi, Overland Park, KS (US); Jeremy R. Breau, Leawood, KS (US); Frederick C. Rogers, Olathe, KS (US); Terry D. Nebergall, Gardner, KS (US); Ramkumar Swaminathan, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 320 days.

(21) Appl. No.: 13/277,818

(22) Filed: Oct. 20, 2011

Related U.S. Application Data

(63) Continuation of application No. 12/463,852, filed on May 11, 2009, now Pat. No. 8,059,643.

(51) Int. Cl.
*H04J 1/16* (2006.01)

(52) U.S. Cl.
USPC .......................................... 370/252; 370/389

(58) Field of Classification Search
CPC ... H04W 80/045; H04W 24/00; H04W 80/04; H04L 43/0852; H04L 12/56
USPC ......... 370/252, 253, 255, 338, 466, 332, 328, 370/329, 333, 349, 389; 709/218, 249
See application file for complete search history.

(56) References Cited

U.S. PATENT DOCUMENTS

| | | | |
|---|---|---|---|
| 6,172,986 B1 | 1/2001 | Watanuki et al. | |
| 7,191,226 B2 * | 3/2007 | Flykt et al. | 709/218 |
| 7,489,658 B2 | 2/2009 | Kim et al. | |
| 7,489,667 B2 * | 2/2009 | Faccin et al. | 370/338 |
| 7,710,964 B2 | 5/2010 | Patil et al. | |
| 8,059,643 B1 | 11/2011 | Shojayi | |
| 2002/0012339 A1 | 1/2002 | Wenzel et al. | |
| 2002/0194259 A1 | 12/2002 | Flykt et al. | |
| 2003/0079021 A1 | 4/2003 | Fan | |
| 2003/0227908 A1 | 12/2003 | Scoggins et al. | |
| 2004/0004940 A1 | 1/2004 | Abrol et al. | |
| 2004/0106393 A1 | 6/2004 | Chowdhury et al. | |
| 2004/0139204 A1 | 7/2004 | Ergezinger et al. | |
| 2005/0066038 A1 | 3/2005 | Sakamoto et al. | |
| 2006/0165062 A1 | 7/2006 | Nishida et al. | |
| 2006/0165093 A1 | 7/2006 | Borella et al. | |
| 2007/0047515 A1 | 3/2007 | Jonsson et al. | |
| 2007/0076690 A1 | 4/2007 | Dyck | |
| 2007/0195755 A1 | 8/2007 | Li et al. | |
| 2008/0075114 A1 | 3/2008 | Mo | |
| 2008/0089339 A1 | 4/2008 | Tsirtsis et al. | |
| 2008/0317064 A1 | 12/2008 | Choi et al. | |

(Continued)

OTHER PUBLICATIONS

Access Service Network (ASN) Gateway, pp. 1-4.

(Continued)

*Primary Examiner* — Chi Pham
*Assistant Examiner* — Alexander O Boakye

(57) ABSTRACT

Methods for registering a first internet protocol version registration request and a second internet protocol version registration request in a single binding on a home agent are provided. In embodiments, entries are recognized as sharing common information in an IPv4 and IPv6 binding table. The entries with common information are combined into one binding. Through the combining of the bindings, the IPv4 and IPv6 sessions are combined into one session.

19 Claims, 7 Drawing Sheets

(56) References Cited

U.S. PATENT DOCUMENTS

2009/0290564 A1 11/2009 Shin et al.
2009/0296630 A1 12/2009 Chen et al.
2009/0316684 A1 12/2009 Buckley et al.

OTHER PUBLICATIONS

Bernardos, Carlos J., et al., IPv6 Network Mobilty, The Internet Protocol Journal, vol. 10, No. 2, pp. 1-7.
Bournelle, J., et al., Diameter Mobile IPv6: Support for Home Agent to Diameter Server Interaction, Dec. 31, 2007, pp. 1-19.
Busaranun, Adisak, et al., Simple Implement of Home Agent Reliability for Mobile IPv6 Network, Thailand, pp. 1-4.
Extending Home Agent Migration to Mobile IPv6 Based Protocols, Berlin, Germany, vol. 4866/2007.
Giaretta, G., et al., Application Master Session Key (AMSK) for Mobile IPv6.
Home Agent and MSP Relocation in Operational Mobile IPv6 Networks.
HP-UX Mobile IPv4, Mar. 2003, pp. 1-16.
IPV4, pp. 1-13, http://en.wikipedia.org/wiki/IPv4.
IPv6 Ready Logo Phase-2, www.ipv6ready.org/about_phase2_test.html.
Johansson, F., et al., RFC3846—Mobile IPv4 Extension for Carrying Network Access Ide, The Internet Society, 2004, pp. 1-7.
Korhonen, J., et al., Diameter Mobile IPv6: Support for Home Agent to Diameter Server Interaction, Dec. 29, 2008, pp. 1-7.
Kulkarni, M., et al., Mobile IPv4 Dynamic Home Agent (HA) Assignment, The Internet Society, 2006, pp. 1-26.
Non-Final Office Actioin mailed Aug. 5, 2010 re U.S. Appl. No. 12/121,255, filed Aug. 15, 2008, 14 pages.
Nursimloo, Deeya S., et al., A Two-Layered Mobility Architecture Using Fast Mobile IPv6 and Session Initiation Protocol.
Pages 1-2. http://www.starentnetworks.com/en/products.php.
State of the Diameter Mobile IPv4 Application, Apr. 15, 2002, pp. 1-14.
Valadon, Guillaume, et al., Extending Home Agent Migration to Mobile IPv6 Based Protocals, vol. 4866, Phuket, Thailand.
Non-Final Office Action in U.S. Appl. No. 12/463,852 mailed Mar. 9, 2011.
Final Office Action in U.S. Appl. No. 12/121,255 mailed Jan. 11, 2011.
Non Final Office Action in U.S. Appl. No. 12/121,255 mailed Jun. 8, 2011.
Notice of Allowance in U.S. Appl. No. 12/121,255 mailed Sep. 2, 2011.

* cited by examiner

IPV4 AND IPV6 SINGLE SESSION ON A HOME AGENT

CROSS-REFERENCE TO RELATED APPLICATIONS

This application is a continuation of U.S. patent application Ser. No. 12/463,852 filed May 11, 2009, which is entirely incorporated herein by reference.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed description section. This summary is not intended to identify key features or essential features of the claimed subject matter, nor is it intended to be used as an aid in isolation to determine the scope of the claimed subject matter.

Embodiments of the present invention provide methods for, among other things, combining more than one instance of different internet protocol versions originating from a common device into a single session so that the several instances share a common binding.

In a first aspect, a method is provided for registering a first internet protocol version registration request and a second internet protocol version registration request in a single binding. In embodiments, the method may comprise receiving the first internet protocol version registration request from a mobile device at a home agent. The first internet protocol version registration request comprises a home address. In the method, the first internet protocol version registration request is recognized as comprising a home address that is unregistered. Based on information in the first internet protocol version registration request, a binding is created at the home agent. Also in the method, a second internet protocol version registration request is received at the home agent from the mobile device. The second internet protocol version registration request comprises a home address. Once the second registration request is received at the home agent, the home address in the second internet protocol version registration request is recognized as matching the home address in the binding associated with the first internet protocol version registration request. Finally, the binding associated with the first internet protocol version registration request is associated with the second internet protocol version registration request.

In a second aspect, a method is provided for combining bindings of an IPv4 registration request and an IPv6 registration request into a single session. In embodiments, the method comprises receiving the IPv4 registration request from a mobile device at a home agent. The IPv4 registration request is recognized as comprising an unregistered home address. Based on the information in the IPv4 registration request, a first binding is created at the home agent. The method also comprises receiving the IPv6 registration request from the mobile device at the home agent. Based on the information in the IPv6 registration request, a second binding is created at the home agent. The home address in the second binding for an IPv6 session is recognized as matching the home address in the first binding for an IPv4 session and, based on that recognition, the first binding and the second binding are combined together in the single session. As such, the single session comprises the IPv4 session and the IPv6 session.

In a third aspect, a method is provided for creating a joint IPv4 and IPv6 session. In embodiments, the method comprises receiving a first request from a mobile node for an IPv4 session at a home agent. The home address of the mobile node is identified as a source of the first request. In embodiments, the method comprises receiving a second request from the mobile node for an IPv6 session at the home agent. The home address of the mobile node is identified as the source of the second request. The mobile device requesting both the IPv4 session and the IPv6 session is recognized as having the same identification listing in a combined IPv4 and IPv6 binding table. The IPv4 session request and IPv6 session request may be combined into one session request.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
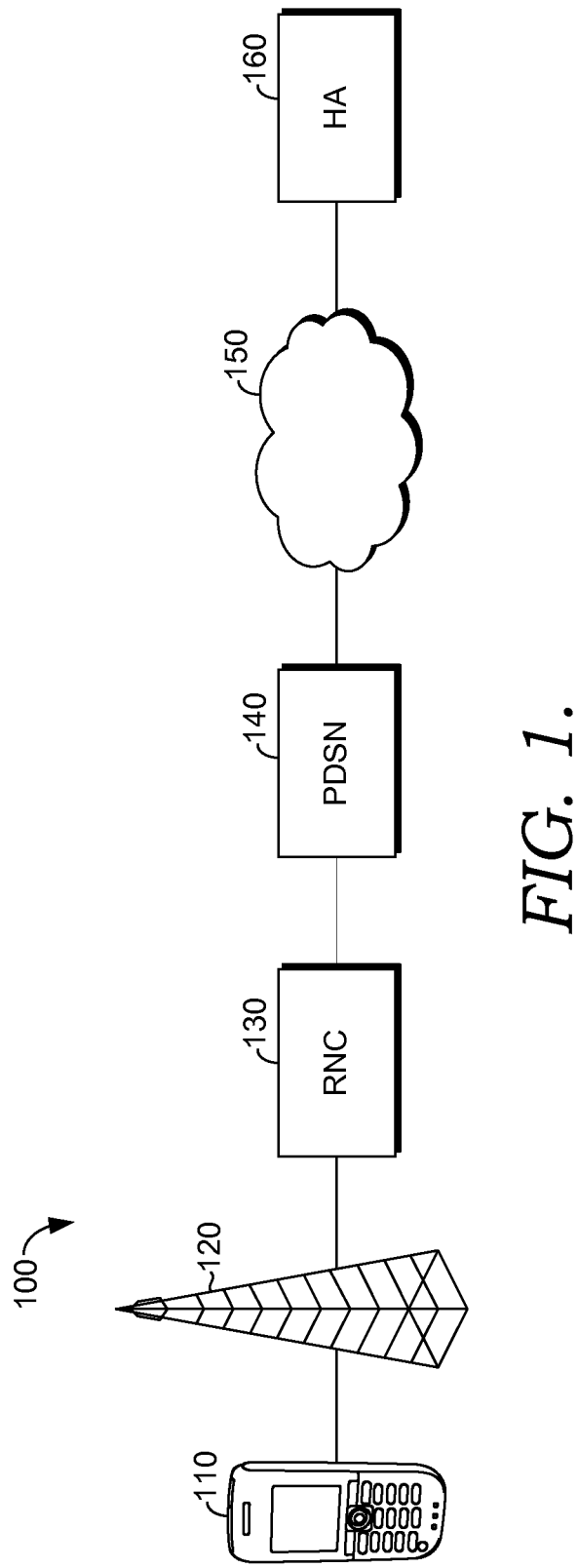
FIG. 1 is a schematic view of an exemplary communication environment suitable for use in implementing embodiments of the present invention.

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies. Although the terms "step" and/or "block" or "module" etc. might be used herein to connote different components of methods or systems employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services.

These acronyms and shorthand notations are intended to help provide an easy methodology of communicating the ideas expressed herein and are not meant to limit the scope of the present invention. The following is a list of these acronyms and shorthand notations:

- 3G Third-Generation Wireless Technology
- 4G Fourth-Generation Cellular Communication System
- AAA Authentication, Authorization, & Accounting
- AMPS Advanced Mobile Phone System
- BTS Base Transceiver Station
- CoA Care-of Address
- CD-ROM Compact Disk Read Only Memory
- CD-ROM Compact Disk Read Only Memory
- CDMA Code Division Multiple Access
- DSL Digital Subscriber Line
- DVD Digital Versatile Discs
- EEPROM Electrically Erasable Programmable Read Only Memory
- GGSN Gateway Support Node
- GSM Global System for Mobile Communications
- IP Internet protocol
- IPv4 Internet protocol Version 4
- IPv6 Internet protocol Version 6
- LAN Local Area Network
- MDN Mobile Directory Number
- MIP Mobile Internet Protocol
- MIPv4 Mobile Internet protocol Version 4
- MIPv6 Mobile Internet protocol Version 6
- NAI Network Access Identifier
- PDA Personal Digital Assistant
- PDSN Packet Data Serving Node
- PPP Point-to-Point Protocol
- RAM Random Access Memory
- ROM Read Only Memory
- RNC Radio Network Controller
- WAN Wide Area Network
- WAP Wireless Access Protocol
- TDMA Time Division Multiple Access
- UMTS Universal Mobile Telecommunications System
- WI-FI Wireless Interface of Mobile Computing Devices
- WIMAX Worldwide Interoperability for Microwave Access Further, various technical terms are used throughout this description. An illustrative resource that fleshes out various aspects of these terms can be found in *Newton's Telecom Dictionary* by H. Newton, $24^{th}$ Edition (2008). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

Embodiments of the present invention may be embodied as, among other things: a method, system, or set of instructions embodied on one or more computer-readable media. Computer-readable media include both volatile and nonvolatile media, removable and nonremovable media, and contemplates media readable by a data store, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Some of these technologies are referred to as computer-storage media.

Embodiments of the present invention provide methods for registering a first internet protocol version registration request and a second internet protocol version registration request in a single binding on a home agent. A binding comprises information associated with registration of a session at a home agent. Exemplary elements of a binding include: home address, care-of-address (CoA), and user identification. This information is found in a session request for a device that is attempting to gain access to the Internet or to data. A binding may also contain additional information that is available and/or necessary for the internet protocol associated with the session request. In embodiments, the first internet protocol version and the second internet protocol version may comprise an IPv4 request and an IPv6 request, respectively. The amount and kind of information included in an IPv4 binding may differ from the amount and kind of information included in an IPv6 binding.

Currently, most internet traffic is conducted using IPv4 addresses. With the number of IPv4 addresses starting to run out, however, the use of IPv6 addresses are beginning to become standardized and enabled as a replacement for IPv4 addresses in the long-term. In the short-term, however, IPv4 and IPv6 must both be able to be easily accessible on a single user device. Currently, in many computing devices, an IPv4 session and an IPv6 session may coexist. These computing devices are typically referred to as dual stack devices, as they are able to process both IPv4 and IPv6 packets. However, the two distinct internet protocol version sessions are treated separately. As such, when a user logs onto a network, there are two separate bindings created at the home agent based on the two separate protocols, e.g. an IPv4 session binding and an IPv6 session binding.

Mobile communication devices such as, but not limited to, cell phones or PDAs may be mobile IP capable. This means that they implement MIPv4 and MIPv6.

Embodiments of the present invention treat an IPv4 session and an IPv6 session originating from a common user device and/or user identification as a single session within the home agent. In embodiments, a single session may be created by combining duplicate information included in the IPv4 and IPv6 sessions. However, given the different size and/or bit size of information comprising the sessions (e.g., an IPv4 request comprises 32 bits, while an IPv6 request comprises 128 bits) and the different requirements of the protocols, the memory taken up at the home agent by a single combined session may be greater than the amount of memory taken up at the home agent by either an IPv4 binding session or an IPv6 binding session.

Outside of the home agent the two sessions may be treated as separate sessions. Within the home agent, the two sessions may be treated as separate sessions prior to an identification of the sessions as originating from a common user device and/or user identification. Benefits of a single session at a home agent include accounting benefits, capacity benefits, traffic monitoring and policy considerations. Accounting, as used herein, refers to the process of monitoring data transfers so that the end user may be charged for the usage. For example, if a user is limited to a certain amount of traffic, it is much easier to track the traffic of the user based on a single combined session than to track the traffic of multiple sessions assigned to the user. Additionally, there may be capacity considerations regarding the number of sessions that may be bound at the home agent. For instance, the home agent may only be allowed to register 500,000 total IPv4 and IPv6 sessions. By combining two sessions associated with a user device, the home agent may effectively free up capacity to register more sessions.

In embodiments, a single session may be created by combining a first internet protocol version request from a device with a second internet protocol version request from the same device. The internet protocol associated with the first request differs from the internet protocol associated with the second request. In alternative embodiments, the first version protocol request may be received at a home agent. After the home agent has checked that a binding associated with identification information included on the first request is not present in the binding tables of the home agent, a first binding may be created using the information included in the first internet protocol version request. Subsequent to creating the first binding at the home agent, a second internet protocol version request is received at the home agent. When checking to determine whether a binding associated with identification information included on the second request is present in the binding tables of the home agent, it will be determined that the first binding is present. User identification information may comprise a Network Access Identifier (NAI), Mobile Directory Number (MDN), etc. After this determination is made, the first binding may be modified to include information required to create a binding for the second session as well as the first session. As such, the first and second sessions are combined into a single session.

In alternative embodiments, a home agent may initially register sessions in response to receiving session requests. The home agent may then periodically compare bindings to determine if there are binding sessions associated with a common user device. The home agent may also or alternatively compare bindings to determine if there are entries associated with a common user device when the home agent nears its capacity of registered sessions. In alternative embodiments, a home agent may automatically create a joint session in response to receiving an IPv4 request by assigning an IPv6 address to the user device. Given the large number of IPv6 addresses, there may not be an issue of running out of IPv6 addresses.

Referring to the drawings in general, and initially to FIG. 1 in particular, an exemplary communication environment suitable for use in implementing embodiments of the present invention is illustrated and designated generally as reference numeral 100. Communication environment 100 is but one example of a suitable communication environment and is not intended to suggest any limitation as to the scope of use or functionality of the invention. Neither should the communication environment 100 be interpreted as having any dependency or requirement relating to any one or combination of components illustrated.

As shown in communication environment 100, a mobile device 110 is connected to a radio network 120. Radio network 120 may comprise a cell tower and a base transceiver station (BTS). A plurality of BTSs may be connected to a radio network controller (RNC) 130. RNC 130 further acts as a hub to connect the radio networks, such as radio network 120, to a packet data serving node (PDSN) 140. PDSN 140 is then connected to a network 150, through which PDSN 140 may be connected to home agent 160. In alternative embodiments, the PDSN 140 may be connected to an Authentication, Authorization, & Accounting (AAA) component used to authenticate requests and/or communications received from the mobile device 110. After these requests are authenticated, they may pass through network 150 to the home agent 160 where they may create a binding utilizing a binding table at the home agent 160.

The mobile device 110 may communicate over established radio frequencies through a radio network 120 comprising a cell tower and a BTS, a number of which are typically connected to a RNC 130. The radio network 120 may communicate over a wireless air interface with one or more devices, such as mobile device 110, located in the wireless coverage area. The communication between the radio network 120 and the mobile device 110 may occur in a digital format, such as CDMA, TDMA, GSM, 3G, 4G, IEEE 802.11x, IEEE 802.16, IEEE 802.20, or may occur in an analog format, such as AMPS. The RNC 130 manages the communication between a number of radio networks 120 and a limited number of mobile devices 110 compatible with the communication environment 100.

Mobile device 110 may communicate with one or more networks 150, such as the Internet or an IP-based network, via the PDSN 140. In the case of a GSM or UMTS network, the GPRS Gateway Support Node (GGSN) performs similar functions as PDSN 140. PDSN 140 may act as the connection point between the Radio Access and IP networks, and may be responsible for managing point-to-point protocol (PPP) sessions between the IP network provided by the mobile provider and a mobile device. It may also connect RNC 130 to network 150, and may act as a network access server, providing a device access to network 150. In many instances, PDSN 140 may act as an access gateway providing simple IP and mobile IP (MIP) access, foreign agent support, and packet transport for virtual private networking. In addition, PDSN 140 may act as a client for AAA servers and may provide mobile stations with a gateway to the IP network. Alternatively or additionally, the communication environment 100 may include other network elements for providing device access to network 150. In embodiments, mobile device 110 may communicate with the home agent 160 via the network 150.

Network 150 could be wired, wireless, or both. Network 150 can include multiple networks as well as a network of networks, but is shown in a more simple form so as to not obscure other aspects of the present invention. For example, network 150 may include one or more wide area networks (WANs), one or more local area networks (LANs), one or more public networks, such as the Internet, and/or one or more private networks. Although single components are illustrated for clarity, one ordinarily skilled in the art will appreciate that network 150 can enable communication between any number of user devices. In embodiments, mobile device 110 may communicate with the home agent 160 via wireless application protocol (WAP).

One ordinarily skilled in the art will recognize that any communication environment 100 having a network suitable for communicating between hosting devices, such as mobile device 110 and home agent 160, may be utilized for implementing the present invention. Such a communication environment 100 may, for example, utilize wireless technology or wired technology for network access. Wireless technology may include any wireless technology including, but not limited to 3G, 4G, WI-FI, WIMAX and the like. Wired technology includes, for example, wireline, DSL, and the like.

Figure 2:
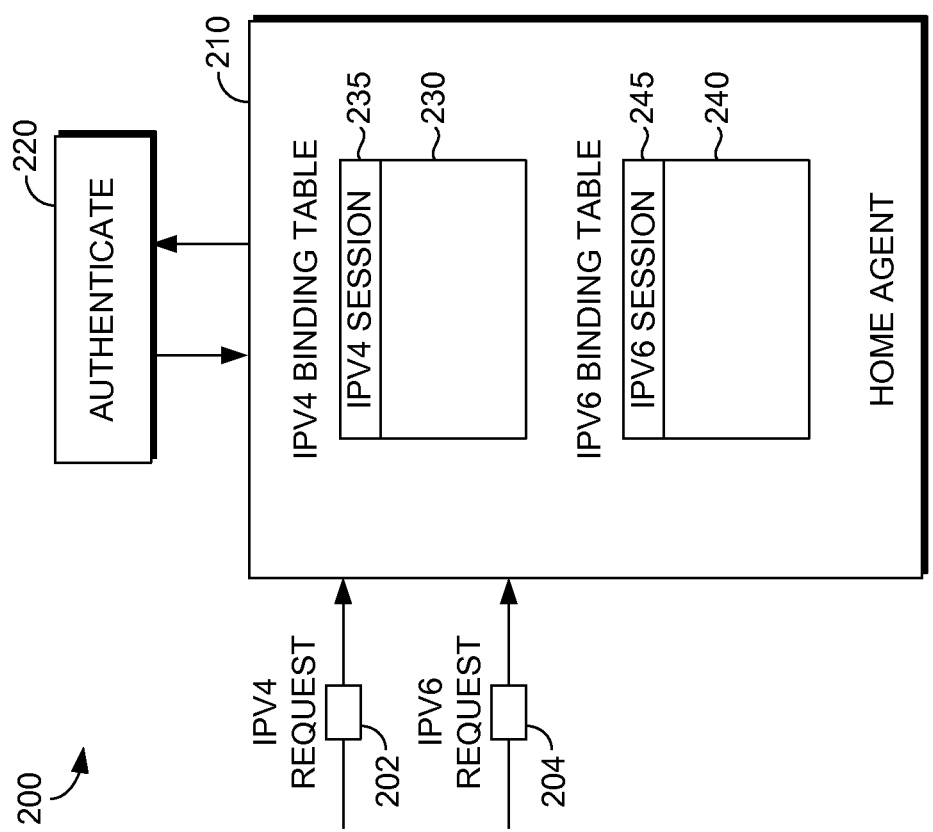
FIG. 2 illustrates an exemplary system for binding a first internet protocol request and a second internet protocol request utilizing two separate binding tables known in the prior art.

FIG. 2 illustrates an exemplary system 200 for binding a first internet protocol request and a second internet protocol request utilizing two separate binding tables known in the prior art. As shown in FIG. 2, an exemplary system 200 includes an IPv4 request 202, an IPv6 request 204, a home agent 210, an AAA 220, an IPv4 binding table 230, an IPv4 session binding 235, an IPv6 binding table 240, and an IPv6 session binding 245.

An IPv4 request 202 is communicated to a home agent 210. Once received at the home agent 210, the IPv4 request 202 is compared against sessions listed in an IPv4 binding table 230. If the information in the IPv4 request 202 matches a session listed in the IPv4 binding table 230, the binding associated with the session may be modified to refresh the lifetime of the session. The lifetime is the amount of time that a binding for a session is registered at the home agent 210. The IPv4 request 202 is authenticated by an AAA 220. Once the IPv4 request 202 is authenticated, the binding is created at the home agent 210 based on the information in the IPv4 request 202. The IPv4 session binding 235 is created and stored at the IPv4 binding table 230. Storage of the IPv4 session binding 235 takes up a discrete amount of memory, "X".

Additionally, an IPv6 request 204 is communicated to the home agent 210. Once received at the home agent 210, the IPv6 request 204 is compared against sessions listed in an IPv6 binding table 240. If the information in the IPv6 request 204 matches a session listed in the IPv6 binding table 240, the binding associated with the session is modified to refresh the lifetime of the session. As stated above, the lifetime is the amount of time that the binding for the session is registered at the home agent 210. The amount of time a session binding has left before it becomes unregistered is a "rest-of-lifetime." If a registration comes in for a registered session binding, the rest-of-lifetime may be modified to recognize the registration of the session binding has been refreshed. The amount of time a refreshed session binding has left before it becomes unregistered is a "modified rest-of-lifetime."

The IPv6 request 204 may be authenticated by an AAA 220. Once the IPv6 request 204 is authenticated, the binding is created at the home agent 210 based on the information in the IPv6 request 204. The IPv6 session binding 245 is created and stored at the IPv6 binding table 240. Storage of the IPv6 session binding 245 takes up a discrete amount of memory, "Y."

Figure 3:
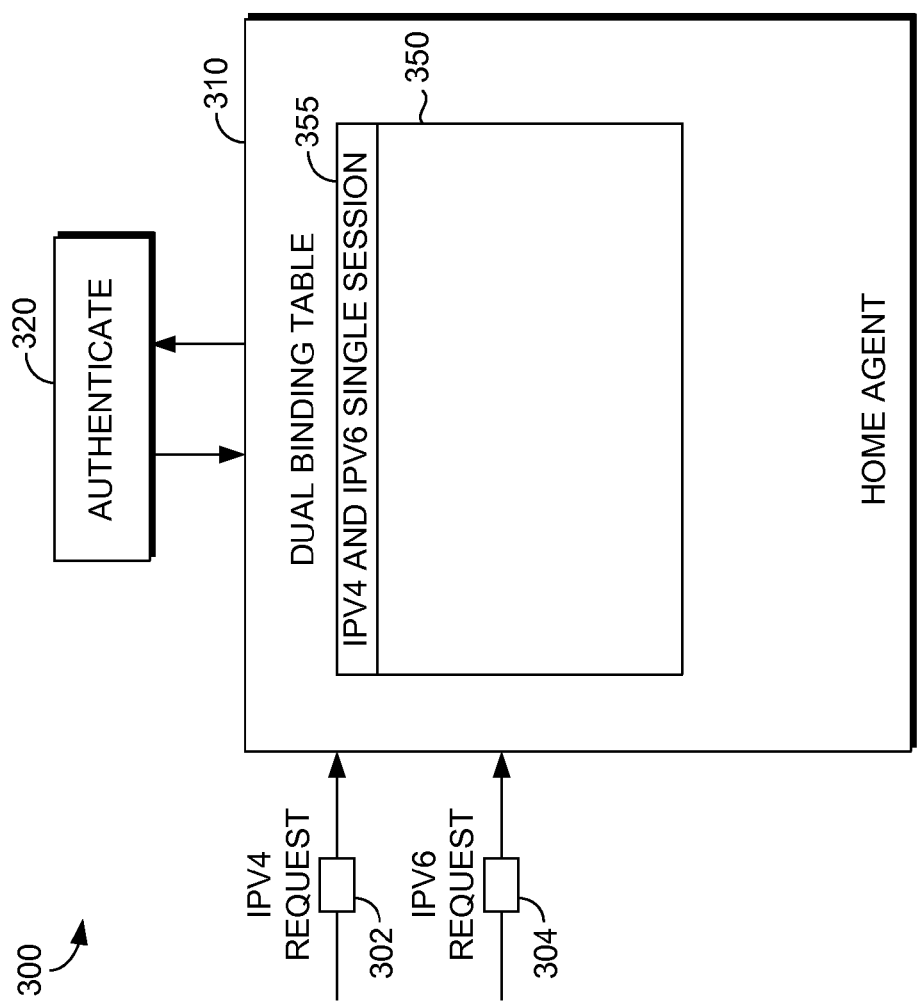
FIG. 3 illustrates an exemplary system for binding a first internet protocol request and a second internet protocol request utilizing one binding table in accordance with an embodiment of the invention.

FIG. 3 illustrates an exemplary system 300 for binding a first internet protocol request and a second internet protocol request utilizing one binding table in accordance with an embodiment of the invention. As shown in FIG. 3, an exemplary system 300 includes an IPv4 request 302, an IPv6 request 304, a home agent 310, an AAA 320, a dual IPv4 and IPv6 binding table 350, and a dual IPv4 and IPv6 session binding 355.

The IPv4 request 302 may be communicated to the home agent 310. Once received at the home agent 310, the IPv4 request 302 may be compared against sessions listed on the dual IPv4 and IPv6 binding table 350. If the information in the IPv4 request 202 matches a session listed in the dual IPv4 and IPv6 binding table 350, the binding associated with the session may be modified to refresh the lifetime of the session. The IPv4 request 302 may be authenticated by the AAA 320. Once the IPv4 request 302 is authenticated, a binding may be created at the home agent 310 based on the information in the IPv4 request 302. The dual IPv4 and IPv6 session binding 355 is created and may be stored at the dual IPv4 and IPv6 binding table 350. Additionally, the IPv6 request 304 may be communicated to the home agent 310. Once received at the home agent 310, the IPv6 request 304 may be compared against sessions listed on the dual IPv4 and IPv6 binding table 350. Once the information in the IPv6 request 304 is identified as matching a session listed on the dual IPv4 and IPv6 binding table 350, the binding associated with the session may be modified to refresh the lifetime of the session. In embodiments, the modification of the dual IPv4 and IPv6 binding may only occur once the IPv6 request 304 is authenticated by an AAA 320.

Figure 4:
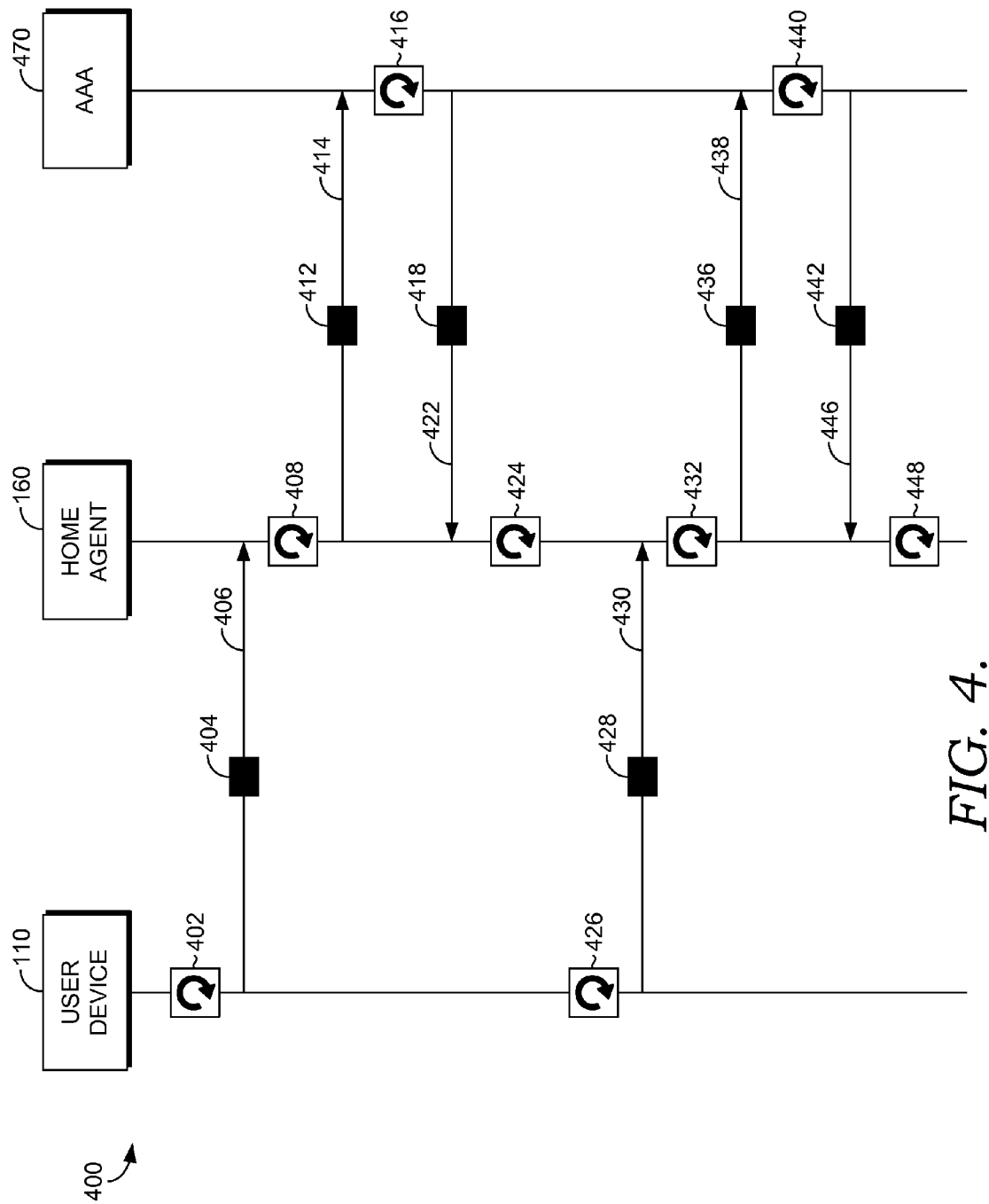
FIG. 4 provides an exemplary call flow diagram that illustrates a method for registering a first internet protocol version registration request and a second internet protocol version registration request in a single binding in accordance with an embodiment of the invention.

FIG. 4 provides an exemplary call flow diagram 400 that illustrates a method for registering a first internet protocol version registration request and a second internet protocol version registration request in a single binding in accordance with an embodiment of the invention. Initially, as shown at block 402, a user device 110 generates an IPv4 session request 404. In embodiments, the IPv4 session request may be a mobile IPv4 (MIPv4) session request. The session request 404 is communicated 406 to a home agent 160. Upon receiving 408 the IPv4 session request 404, the home agent 160 generates an authentication request 412 to authenticate the IPv4 session request 404. The home agent 160 transmits (414) the authentication request 412 to an AAA 470, where it is received (416). Still at block 416, the authentication request 412 is verified, and an authentication response 418 is generated at the AAA 470. The authentication response 418 is then transmitted (422) to the home agent 160. After being received (424) at the home agent 160, the IPv4 session request 404 is recognized as being authentic. Authentication, as used herein, is a technique where the user gives credentials to the network so that the network may ensure the user's identity, and also allows for accounting to be enabled so that the user may connect to the network and perform data transfers. Still at block 424, the home agent 160 uses identification information within the IPv4 session request 404 to determine whether a binding with that identification information already exits. After determining the binding with the same information does not exist, the binding is created at the home agent 160 based on information in the IPv4 session request 404, and an IPv4 session is created.

At block 426, a user device 110 generates an IPv6 session request 428. In embodiments, the IPv6 session request may be a MIPv6 session request. The session request 428 is communicated (430) to the home agent 160. Upon receiving (432) the IPv6 session request 428, the home agent 160 generates an authentication request 436 to authenticate the IPv6 session request 428. The home agent 160 transmits (438) the authentication request 436 to the Authentication, Authorization, & Accounting (AAA) 470, where it is received (440). Still at block 440, the authentication request 436 is verified, and an authentication response 442 is generated at the AAA 470. The authentication response 442 is then transmitted (446) to the home agent 160. After being received (448) at the home agent 160, the IPv6 session request 428 is recognized as being authentic. Still at block 448, the home agent uses identification information within the IPv6 session request 428 to determine whether the binding with that identification information already exits. After determining the binding with the same information does exist (in the binding described above associated with the IPv4 session request 404), the binding is modified to include information to support the IPv6 session in addition to supporting the IPv4 session.

Figure 5:
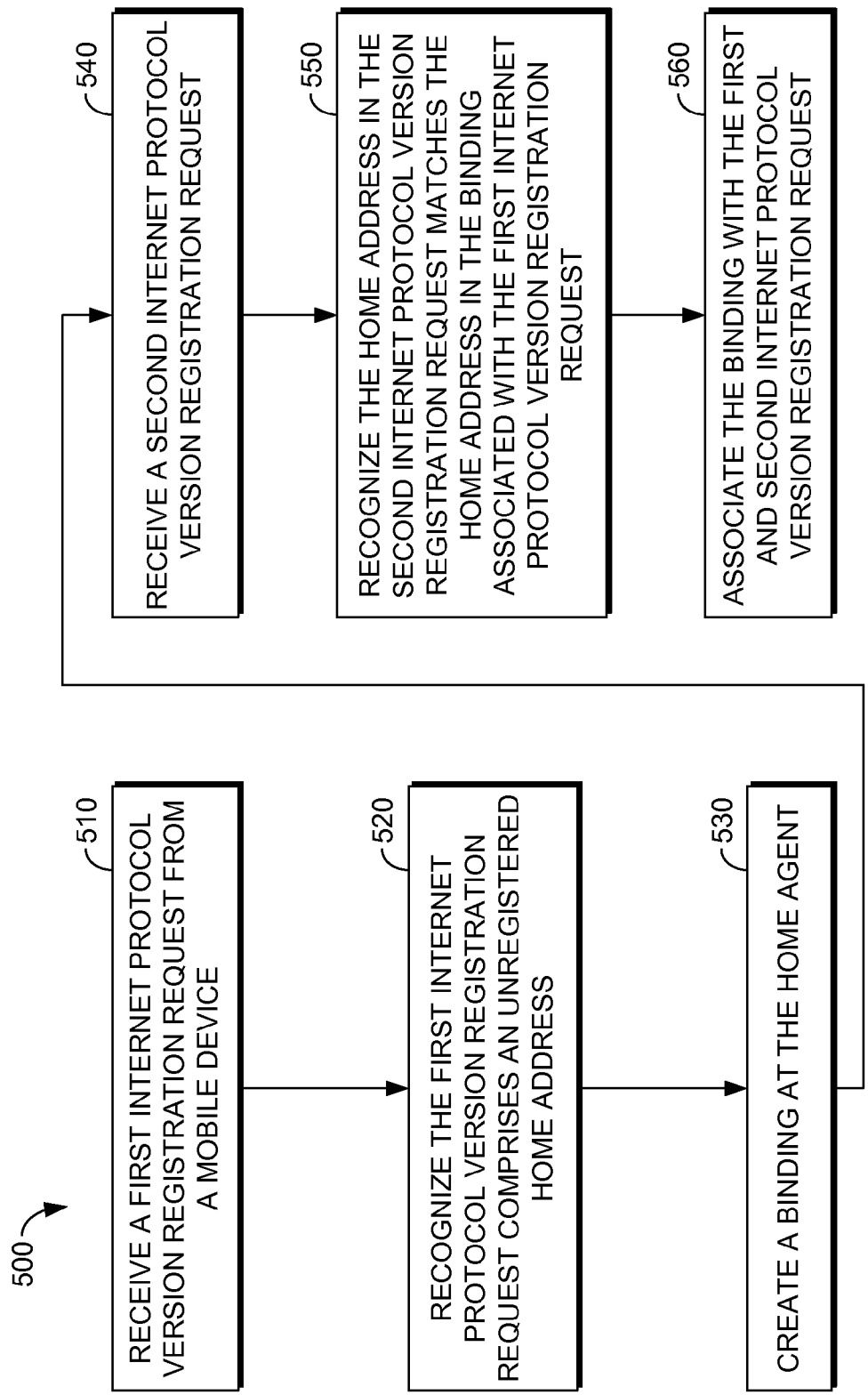
FIG. 5 provides a flow diagram that illustrates a method for registering a first internet protocol version registration request and a second internet protocol version registration request in a single binding in accordance with an embodiment of the invention.

FIG. 5 illustrates a flow diagram 500 of a method for registering a first internet protocol version registration request and a second internet protocol version registration request in a single binding in accordance with an embodiment of the invention. Initially, as illustrated at block 510, a first internet protocol version registration request is received from a mobile device. The request is received at a home agent. Additionally, the first internet protocol version registration request comprises a home address. Next, at block 520, the first internet protocol version registration request is recognized as comprising an unregistered home address. At block 530, a binding is created at the home agent. At block 540, a second internet protocol version registration request is received at the home agent. At block 550, the home address in the second internet protocol version registration request is recognized as matching the home address in the binding associated with the first internet protocol version registration request. At block 560, the binding is associated with the first and second internet protocol version registration requests.

Figure 6:
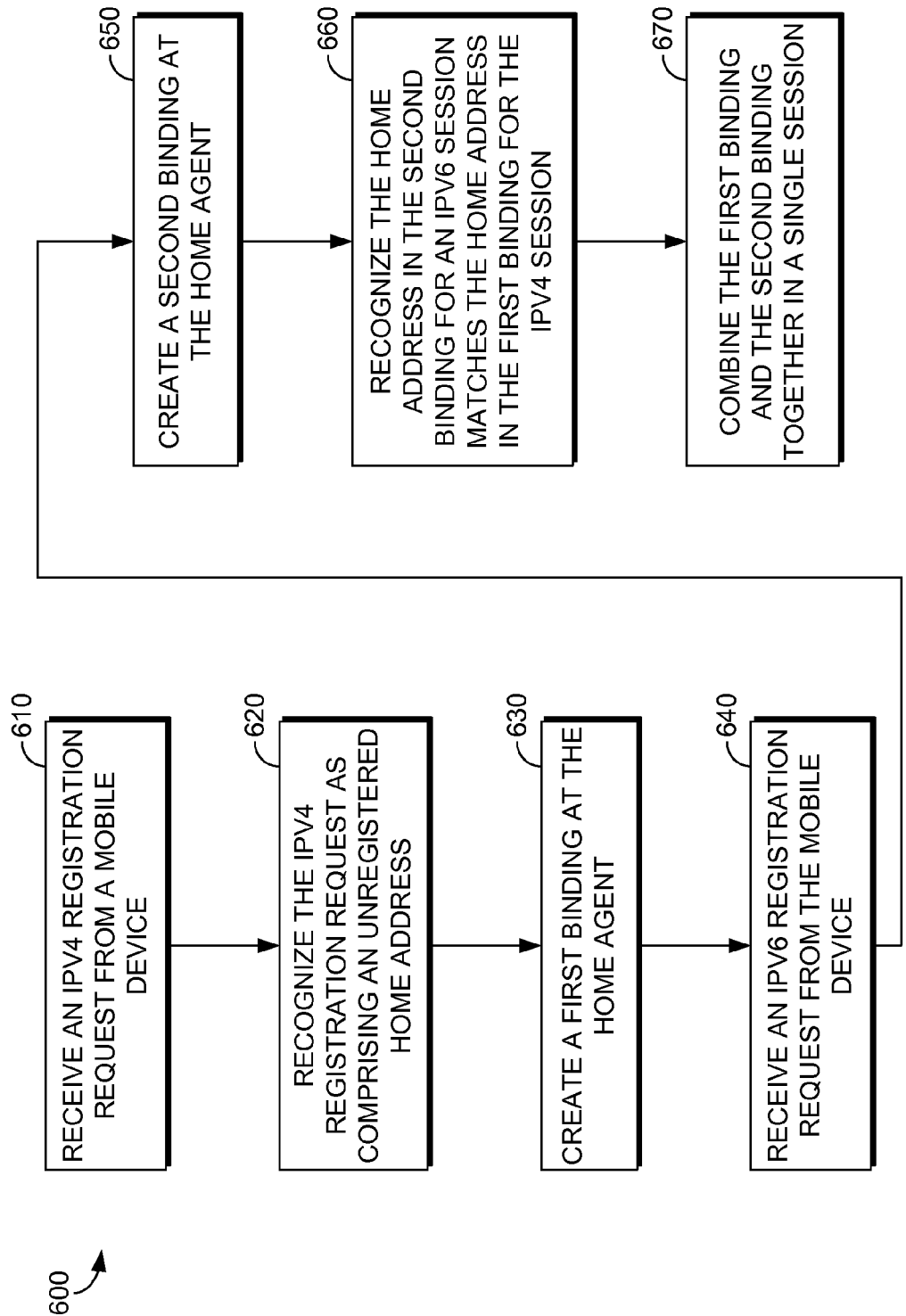
FIG. 6 provides a flow diagram for combining bindings of an IPv4 registration request and an IPv6 registration request into a single session in accordance with an embodiment of the invention.

FIG. 6 provides a flow diagram 600 that illustrates a method for combining bindings of an IPv4 registration request and an IPv6 registration request into a single session in accordance with an embodiment of the present invention. Initially, as illustrated at block 610, an IPv4 registration request is received from a mobile device. The request is received at a home agent. At block 620, the IPv4 registration request is recognized as comprising an unregistered home address. Next, at block 630, a first binding is created at the home agent. The first binding includes information in accordance with the IPv4 protocol. The information includes the home address of the IPv4 registration request. At block 640, an IPv6 registration request is received from the mobile device. At block 650, a second binding is created at the home agent. The second binding includes information in accordance with the IPv6 protocol. The information includes the home address of the IPv6 registration request. At block 660, the home address in the second binding for an IPv6 session is recognized as matching the home address in the first binding for an IPv4 session. At block 670, the first binding and the second binding are combined into a single session.

Figure 7:
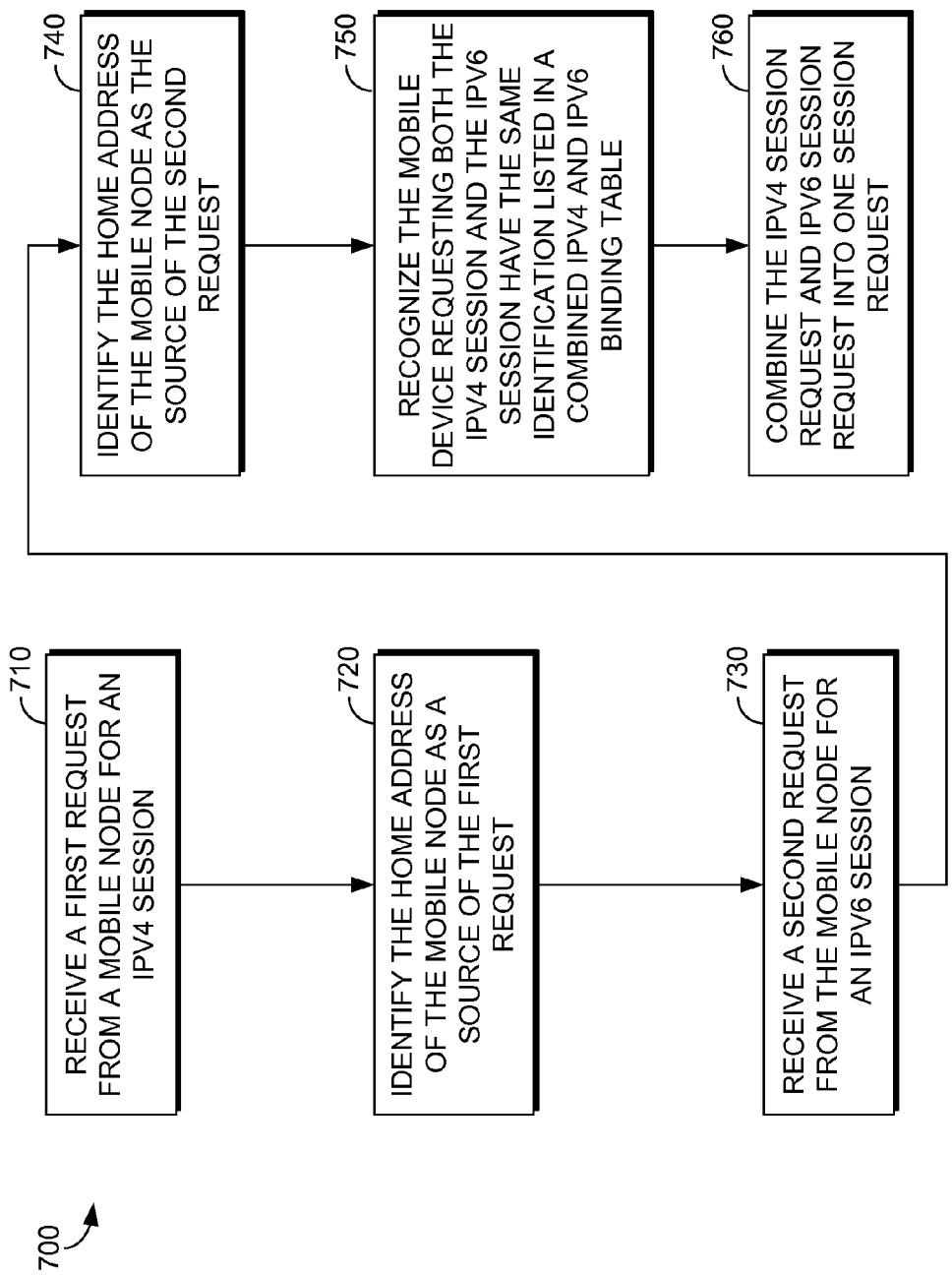
FIG. 7 provides a flow diagram for creating a joint IPv4 and IPv6 session in accordance with an embodiment of the invention.

FIG. 7 provides a flow diagram 700 that illustrates a method for creating a joint IPv4 and IPv6 session in accordance with an embodiment of the present invention. Initially, as illustrated at block 710, a first request is received from a mobile node for an IPv4 session. The first request is received at a home agent. At block 720, the home address of the mobile node is identified as a source of the first request. At block 730, a second request is received from the mobile node for an IPv6 session. The second request is received at the home agent. At block 740, the home address of the mobile node is recognized as the source of the second request. At block 750, the mobile device requesting both the IPv4 session and the IPv6 session is recognized as having the same identification listed in a combined IPv4 and IPv6 binding table. At block 760, the IPv4 session request and the IPv6 session request are combined into one session request.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method of combining multiple session requests into a single binding in a communications system, the method comprising:
   receiving a first session request from a communications device of the communications system attempting to access data;
   registering the first session request to form a first session binding at a home agent;
   receiving a second session request from the communications device to access data;
   registering the second session request to form a second session binding at the home agent, wherein some information in the second session request differs from information in the first session request; and
   combining the first session binding with the second session binding to form a combined single binding at the home agent.

2. The method of claim 1, wherein the first session binding and the second session binding are treated as separate sessions prior to identification of a common user device or a common user identification.

3. The method of claim 1, further comprising: storing the combined single binding in a dual binding table.

4. The method of claim 1, further comprising: relaying at least one registration request of the first session request and the second session request to a foreign agent.

5. The method of claim 1, further comprising: eliminating the first session binding and the second session binding after forming the combined single binding.

6. The method of claim 1, further comprising: determining whether the first session binding already contains identification information from the second session request.

7. The method of claim 1, further comprising: modifying the first session binding to include information to support the second session in addition to the first session.

8. A method of combining multiple session requests into a single binding in a communications system, the method comprising:
   receiving a first session request from a communications device of the communications system attempting to access data;
   registering the first session request to create a binding at a home agent;
   receiving a second session request from the communications device to access data, wherein a bit size of the second session request differs from a bit size of the first session request;
   recognizing a home address of the second session request matches a home address of the binding; and
   combining the second session request with the binding to form a combined single session binding associated with the first session request and the second session request at the home agent.

9. The method of claim 8, wherein combining the second session request with the binding comprises: modifying the binding associated with the first session request to recognize the second session request.

10. The method of claim 8, wherein combining the second session request with the binding comprises: modifying the binding associated with the first session request to incorporate identification of the first session request and the second session request.

11. The method of claim 8, further comprising: eliminating the binding after forming the combined single session binding.

12. The method of claim 8, wherein the binding comprises information associated with registration of the first session at the home agent.

13. The method of claim 12, wherein the information is located in the first session request of the communications device.

14. The method of claim 12, wherein the binding comprises at least one of a home address, a care-of-address, or a user identification.

15. A method of combining multiple session requests into a single binding in a communications system, the method comprising:

receiving a first session request from a communications device of the communications system attempting to access data;

registering the first session request to form a first binding at a home agent;

receiving a second session request from the communications device at the home agent to access data, wherein a protocol of the second session request differs from a protocol of the first session request; and combining the second session request with the first binding to form a combined single session at the home agent, wherein the first binding is modified to include information from the second session request to create the combined single session.

16. The method of claim 15, wherein the home agent automatically creates the combined single session by assigning a particular internet protocol version address to the communications device upon receiving session requests.

17. The method of claim 15, further comprising: modifying the first binding to include a modified rest-of-lifetime.

18. The method of claim 15, wherein combining the second session request with the first binding comprises: associating the first binding with the second session request.

19. The method of claim 18, wherein associating the first binding with the second session request comprises:

eliminating at least part of the first binding associated with the first session request; and creating a portion comprising at least part of the first binding associated with the first session request and comprising a portion recognizing the second session request.

\* \* \* \* \*